US012699862B2

(12) United States Patent
    Fabian et al.

(10) Patent No.: US 12,699,862 B2
(45) Date of Patent: Aug. 4, 2026

(54) METHOD FOR THE PRODUCTION OF A SECURITY FEATURE, SECURITY FEATURE FOR A DATA MEDIUM, DATA MEDIUM, AND LAMINATION SHEET

(71) Applicant: GIESECKE+DEVRIENT EPAYMENTS GMBH, Munich (DE)

(72) Inventors: Cristina Fabian, Garching (DE); Gunter Endres, Passau (DE); Klaus Kohl, Miesbach (DE); Thanh-Hao Huynh, Bruckmuhl (DE); Robert Ernst, Grobenzell (DE)

(73) Assignee: GIESECKE+DEVRIENT EPAYMENTS GMBH, Munich (DE)

( * ) Notice: Subject to any disclaimer, the term of this patent is extended or adjusted under 35 U.S.C. 154(b) by 18 days.

(21) Appl. No.: 18/682,375

(22) PCT Filed: Aug. 9, 2022

(86) PCT No.: PCT/EP2022/025369
    § 371 (c)(1),
    (2) Date: Feb. 8, 2024

(87) PCT Pub. No.: WO2023/016670
    PCT Pub. Date: Feb. 16, 2023

(65) Prior Publication Data
    US 2024/0354541 A1    Oct. 24, 2024

(30) Foreign Application Priority Data

Aug. 11, 2021    (DE) .......................... 102021004131.3
    Jul. 6, 2022    (DE) .......................... 102022002471.3

(51) Int. Cl.
    *G06K 19/06*    (2006.01)
    *G06K 1/12*    (2006.01)
(52) U.S. Cl.
    CPC ......... *G06K 19/06121* (2013.01); *G06K 1/12* (2013.01)
(58) Field of Classification Search
    CPC ........................... G06K 19/06121; G06K 1/12
    (Continued)

(56) References Cited

U.S. PATENT DOCUMENTS 4,765,656 A    8/1988  Becker et al.
    7,150,405 B2    12/2006  Hoppe et al.
    (Continued)

FOREIGN PATENT DOCUMENTS

CN        103338942 A    10/2013
    CN        108025583 A    5/2018
    (Continued)

OTHER PUBLICATIONS

German Search Report from corresponding DE Application No. 102021004131.3, Feb. 1, 2022.
    (Continued)

*Primary Examiner* — Allyson N Trail
(74) *Attorney, Agent, or Firm* — Workman Nydegger

(57) ABSTRACT

A method for producing a security feature for a data medium, includes the steps of: providing a molding means having a molding structure of a representation of the security feature; introducing the representation into a substrate by impressing the molding structure; and arranging a light-diffractive or light-refractive structure on the substrate.

15 Claims, 5 Drawing Sheets

(58) Field of Classification Search
USPC ........................................................ 235/488
See application file for complete search history.

(56) References Cited

U.S. PATENT DOCUMENTS

| | | | |
|---|---|---|---|
| 7,757,538 B2 | 7/2010 | Mitterhofer et al. | |
| 8,313,981 B2 | 11/2012 | Tarantino | |
| 10,438,309 B2 | 10/2019 | Holmes et al. | |
| 10,625,532 B2 | 4/2020 | Kaule et al. | |
| 11,798,305 B1* | 10/2023 | Rodriguez | G06V 10/443 |
| 11,880,731 B2 | 1/2024 | Riedl | |
| 2007/0278785 A1* | 12/2007 | Nemeth | G03H 1/02 |
| | | | 250/492.1 |
| 2009/0091834 A1* | 4/2009 | Ryzi | G03H 1/0011 |
| | | | 359/569 |
| 2009/0315316 A1* | 12/2009 | Staub | B42D 25/00 |
| | | | 347/225 |
| 2010/0195174 A1* | 8/2010 | Nemeth | B42D 25/435 |
| | | | 359/2 |
| 2011/0128600 A1 | 6/2011 | Tompkin et al. | |
| 2013/0069360 A1* | 3/2013 | Power | B42D 25/29 |
| | | | 283/85 |
| 2018/0178577 A1* | 6/2018 | Lister | B41M 3/14 |
| 2018/0339503 A1 | 11/2018 | Finn et al. | |
| 2019/0018365 A1* | 1/2019 | Stasiak | G03H 1/0252 |
| 2019/0152252 A1 | 5/2019 | Thurailingam et al. | |
| 2020/0257953 A1 | 8/2020 | Lotya et al. | |
| 2021/0110231 A1 | 4/2021 | Finn | |
| 2022/0048311 A1* | 2/2022 | Godfrey | B42D 25/342 |
| 2022/0194117 A1* | 6/2022 | Brandstetter | B42D 25/364 |

FOREIGN PATENT DOCUMENTS

| | | |
|---|---|---|
| DE | 10126368 A1 | 12/2002 |
| DE | 102008019571 A1 | 10/2009 |
| DE | 102015015908 A1 | 6/2017 |
| DE | 102019005934 A1 | 2/2021 |
| EP | 0219012 A2 | 4/1987 |
| EP | 1629994 B1 | 6/2011 |
| EP | 2162294 B1 | 3/2012 |
| EP | 2710864 B1 | 2/2019 |
| WO | 2011116425 A1 | 9/2011 |

OTHER PUBLICATIONS

International Search Report from corresponding PCT Application No. PCT/EP2022/025369, Nov. 18, 2022.
Chinese Office Action from Corresponding Chinese Patent Application No. CN202280055173.6, Dec. 31, 2025.

* cited by examiner

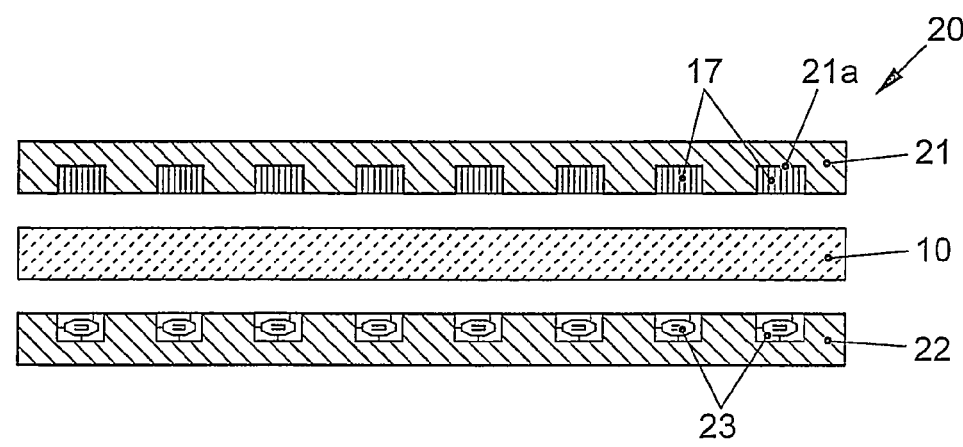
FIG. 8
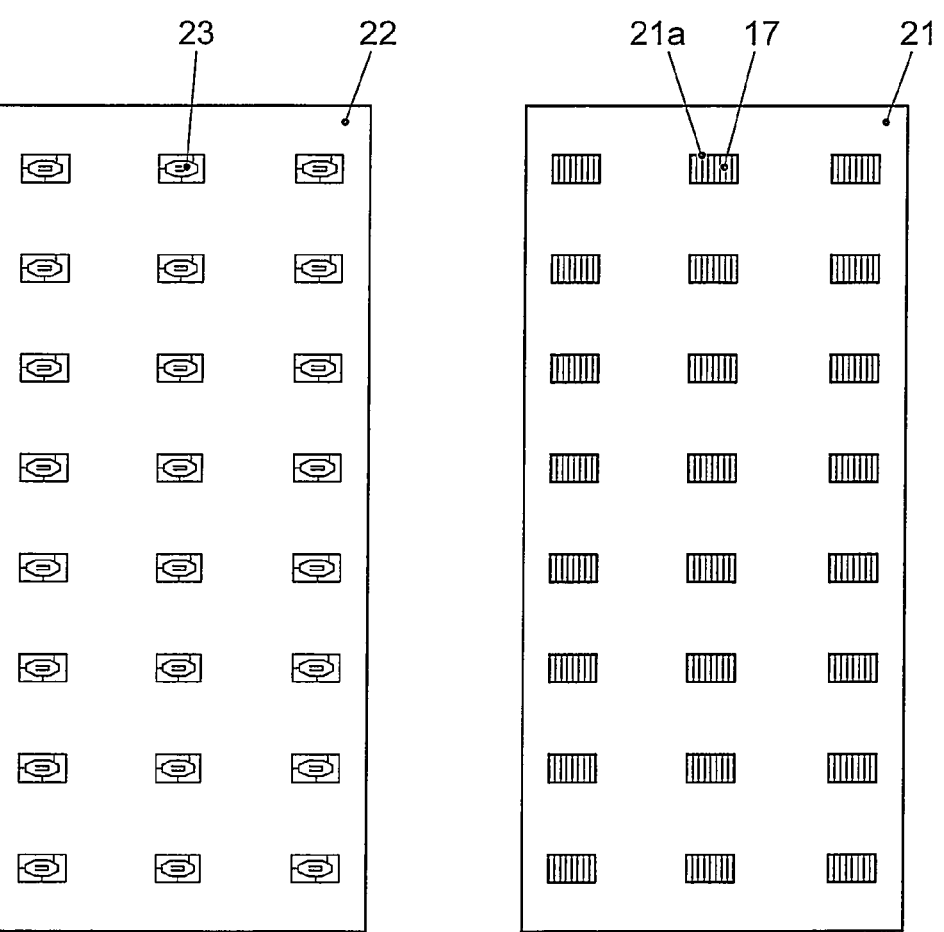
FIG. 9a                    FIG. 9b

METHOD FOR THE PRODUCTION OF A SECURITY FEATURE, SECURITY FEATURE FOR A DATA MEDIUM, DATA MEDIUM, AND LAMINATION SHEET

FIELD OF THE DISCLOSURE

The invention relates to a method for producing a security feature for a data medium, to a security feature for a data medium, to a data medium with a security feature, and to a lamination sheet for producing a security feature.

BACKGROUND

Data media such as value documents, for example passport and ID documents, ID cards, credit cards, bank cards, and the like are increasingly used in public areas, but also in the internal business sector.

The practice of providing such value documents or banknotes with lens arrays for example in the form of lenticular lenses has been known for quite some time. Such structures equip the value documents with optically variable effects, for example tilting images, which should offer protection against reproduction at the same time.

EP 1629994 B1 discloses a method for the production of a three-dimensional embossing sheet for the production of surface-embossed cards and documents by means of lamination. Various embossing structures, such as lens structures and microtype structures, are worked into the surface of a highly polished embossing sheet using various processing techniques.

DE 1126368 A1 discloses a method for producing a portable data medium with an embossed surface structure. Embossing is carried out by means of an embossing stamp and a counter stamp on a pre-laminated semi-finished product. The embossed surface structure can be in particular a lens structure.

Other security features, for example referred to as Magic ID, are printed in offset, for example, and a lens is placed thereover.

EP 2162294 B1 discloses a method for forming a security element in the form of a microoptical moiré magnification arrangement on an ID card or a security document. An image motif is computationally divided into a multiplicity of micromotif image parts, which are arranged periodically in a grid. The typically printed micromotif image parts are viewed through a focusing element grid in the form of a lens arrangement. When the viewing angle changes, the viewer has the impression that the image motif is moving. The process for producing such security elements is complicated. Moreover, the image quality of the security feature depends on the printing process.

SUMMARY

It is the object of the present invention to simplify the production of a visually checkable security feature acting by means of a lens structure and at the same time to improve the image quality of the security feature. In addition, a substrate in which the security feature is formed should also be protected against manipulation and counterfeiting.

This object is achieved by a method for producing a security feature, by a security feature for a data medium, by a data medium or a lamination sheet.

A method according to the invention for producing a security feature for a data medium comprises the steps of:

providing a substrate which is transparent or partially transparent in the visible spectral range;

introducing the representation into one side of the substrate by impressing the molding structure; and forming a light-diffractive or light-refractive structure on the opposite side of the substrate.

A basic idea of the present invention is that the security feature is completely impressed or embossed and is no longer partially printed as has otherwise been typical. The molding structure of the representation of the security feature is a negative or positive element in the lamination sheet that is imaged onto the data medium. It is additionally molded into a substrate or a layer, for example made of a plastic such as PET, PC, PVC or PP. Pressure and heat can be used when introducing the representation into the substrate.

The molding structure can be introduced into the molding means using methods such as milling, laser treatment, etching, 3D printing or the like. Such methods have a better resolution than conventional printing methods such as offset printing.

The method proposed here has the advantage that the higher resolution than in a plate exposure allows a finer representation of the security feature. These filigree structures having a smaller structure width allow for more details in static security features and a smoother progression in the case of moving images or tilting images. More complex movements can now be realized as well.

Since there is no need to print elements, production can be simplified. In addition, the security features are limited in size by printing technology. The production proposed here also allows for larger security features, for example a milling process in a plate-type molding means such as a lamination sheet is not limited.

Another advantage of the invention is that the substrate selected can be transparent. The substrate may also be designed to be partially transparent or opaque with a transparent or partially transparent window. Then, the security feature or the representation can be viewed from both sides, i.e. from a front side and a back side. The light-diffractive or light-refractive structure can then be disposed on one side of the substrate and the representation can be disposed on the opposite side of the substrate.

A further advantage of the invention is that it protects the substrate in which the security feature is formed against manipulation and counterfeiting.

Provision may also be made for the molding means to be a lamination sheet and for the representation to be introduced during lamination of the substrate. The representation can thus be introduced into the lamination sheet as a lamination structure and then laminated into the substrate. On the lamination sheet, and also on other molding means, a multiplicity of molding structures in each case of a representation of the security feature can be provided, with the result that the security feature can be produced in sheets of material. Such a sheet of material is later divided into individual security features.

Provision may be made for the light-diffractive or light-refractive structure to be disposed on the substrate during lamination by means of a second lamination sheet. This further simplifies manufacture. In particular, the light-diffractive or light-refractive structure and the representation can be introduced simultaneously. This can further reduce the manufacturing time.

Provision may also be made for a superimposed security element to be introduced into the substrate with a laser by changing the substrate material locally in terms of color.

Preferably, the substrate for this purpose has at least one laser-sensitive layer and the superimposed security element is formed in this layer.

Provision may be made for the superimposed security element to be introduced through the light-diffractive or light-refractive structure. Provision may furthermore be made for the superimposed security element to be introduced after the first security feature has been produced.

Provision may also be made for the molding means to be a stamp and for the representation to be introduced after lamination of the substrate. As an alternative to the lamination sheet, one or more stamps may be provided for introducing the representation into the substrate. The stamp is provided with the same molding structure of a representation of the security feature. Finished sheets can be run over the stamp(s). The plastic of the substrate is melted before stamping, which can be achieved by lamination or another process step, even without lamination. In general, for example, a lamination sheet, an embossing stamp, a gravure plate and/or an ultrasonic process can be used for introducing the representation into the substrate.

Provision may be made for the molding structure to be introduced into the molding means with a laser cutting, milling, water jet cutting or a galvanic method. In principle, all methods with which fine structure widths can be introduced into the molding means are suitable. A sandblasting method can also be used, for example. For example, the molding means can be a metal sheet.

Provision may furthermore be made for elements of the molding structure to be calculated such that the representation is a moving representation when the security feature is tilted. This can be done in a data preparation before the molding structure is introduced into the molding means, such as a milling process in a metal sheet. For example, the moving representation can be a tilting image which tilts or alternates between two or more representations when the representation is moved relative to the eye of the viewer. For example, the moving representation can also be a movement across multiple images. These images can be represented as moving in an endless movement. The finer structure of the representation allows more images to be generated, as the distance between two optical structures, such as a lens, usually stipulates the number of images.

A security feature according to the invention for a data medium comprises a substrate which is transparent or partially transparent in the visible spectral range and in which a representation has been molded which together with a light-diffractive or light-refractive structure generates an optically variable image, and having a light-diffractive or light-refractive structure formed on the substrate, which structure at least partially covers the representation and interacts with it in order to generate a moving representation when the security feature is tilted.

Provision may be made for the substrate to be transparent. Since according to the present invention the representation of the security feature is molded and not printed, the substrate selected can now be transparent. The substrate may also be designed to be partially transparent or opaque with a transparent or partially transparent window. Then, the security feature or the representation can be viewed from both sides, i.e. from a front side and a back side. The light-diffractive or light-refractive structure can then be disposed on one side of the substrate and the representation can be disposed on the opposite side of the substrate.

Provision may further be made for the representation to be a moving representation when the security feature is tilted. For example, the moving representation can be a tilting image which tilts or alternates between two or more representations when the representation is moved relative to the eye of the viewer. For example, the moving representation can also be a movement across multiple images. These images can be represented as moving in an endless movement. The finer structure of the representation allows more images to be generated, as the distance between two optical structures, such as a lens, usually stipulates the number of images.

Provision may be made for the light-diffractive or light-refractive structure to comprise a surface relief in the form of a lens array. By means of a lens array with a number or multiplicity of individual lenses, such as ball lenses, rod lenses and/or cylindrical lenses, a good optical representation and a smooth movement of the representation can be achieved.

A data medium according to the invention, for example a value document or a chip card, comprises a carrier on or in which a security feature as described above is arranged. The data medium can also be a packaging, such as a security packaging with a security seal, for example, for medications. Likewise, the data medium can be such a security seal. The security feature can be arranged entirely in an opening in the data medium. The opening with the security feature therein can be covered, for example, by means of one or more films. Otherwise, the same advantages and modifications as described above apply.

Provision may be made for the value document to be a banknote, passport or identity document. Ultimately, the security feature may be disposed on any data medium, such as a value document or a chip card.

A lamination sheet according to the invention for the production of a security feature for a data medium comprises a molding structure of a representation of a security feature. The lamination sheet can be used in the method for producing a previously described security feature. Otherwise, the same advantages and modifications as described above apply accordingly.

Provision may be made for the molding structure to be introduced into the molding means with a laser cutting, milling, water jet cutting, 3D printing or a galvanic method. In principle, all methods with which fine structure widths can be introduced into the lamination sheet are suitable. For example, the molding means can be a lamination sheet.

BRIEF DESCRIPTION OF THE DRAWINGS

The present invention is described by way of example below, with reference being made to the attached drawings, in which:

FIG. 8 shows an added-value production of security features;

FIGS. 9A and 9B show a basic illustration of lamination sheets for the production of a security feature.

DETAILED DESCRIPTION OF THE INVENTION

Figure 1:
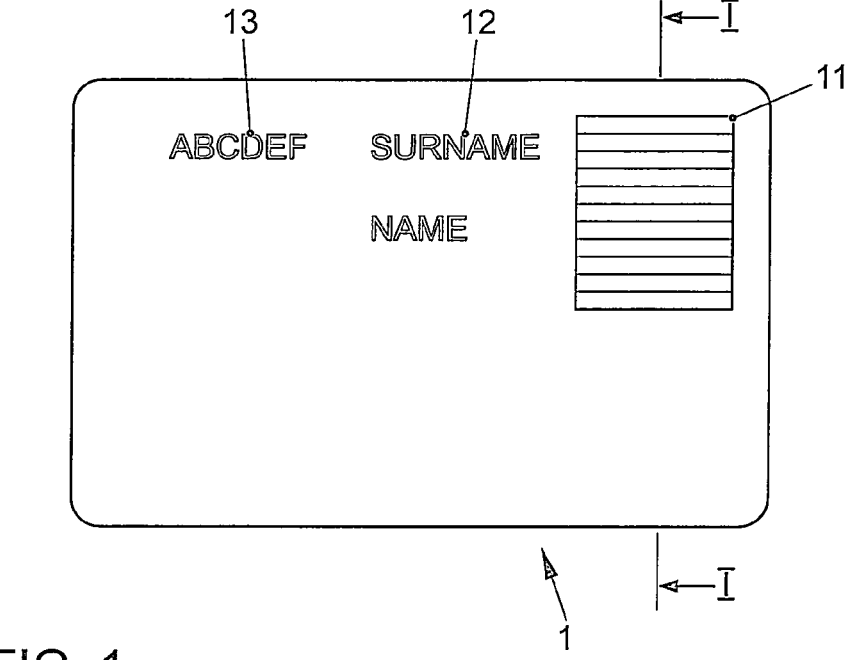
FIG. 1 shows a top view of a data medium with a security feature.

FIG. 1 shows a top view of a data medium 1 in a schematic illustration. The data medium 1 may be a value document in the form of a banknote, a passport and identity document or the like. Likewise, the data medium 1 may be a chip card. In the example shown in FIG. 1, the data medium 1 is an identity document.

The data medium 1 contains a security feature 11, which generates a visually checkable optically variable image, for example a symbol. The optically variable image is a moving image or a tilting image. The security feature 11 is at least partially arranged in a region 1 of the data medium 1 in which the latter is transparent or partially transparent in the visible spectral range.

The data medium 1 contains further person-related data 12, for example the first and last name of the owner. Moreover, the identity card may contain further data 13, for instance date of birth, nationality, issuing authority, date of issue and the like.

Figure 2:
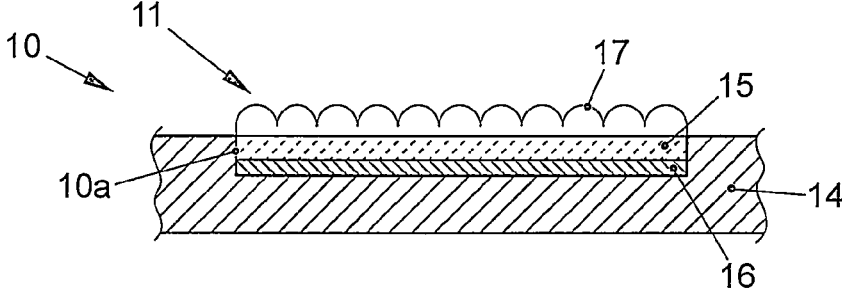
FIG. 2 shows a sectional illustration of the data medium of FIG. 1 according to the line I-I.

The basic structure of the security feature 11 will now be explained in detail with reference to FIG. 2, which shows a section through a first embodiment of the data medium 1 along the line I-I in FIG. 1.

The data medium 1 forms a substrate 10, which is transparent or partially transparent in the visible spectral range, for the security feature 11. In the embodiment according to FIG. 2, the substrate 10 consists of a card body 14 which is transparent or partially transparent in the visible spectral range and of the security feature 11, which is at least partially arranged in an opening 1*a* in the data medium 1 or the card body 14. The card body 14 may in principle also be opaque, in which case a transparent or partially transparent portion is provided in the region of the security feature 11.

The security feature 11 comprises a carrier element 15 which is transparent or partially transparent in the visible spectral range and into which a representation 16 is molded. The representation 16 is introduced in the form of a surface relief on one side, here a bottom side or back side, of the carrier element 15.

On an opposite side of the carrier element 15, here an upper side or front side, a light-diffractive or light-refractive structure 17 is arranged, which at least partially covers the security feature 11 or the representation 16.

The carrier element 15 may contain or consist of phosphorescent fluorescent or phosphorescent materials. The same applies to any further layers or extruded films which may be present and which are a constituent part of or interact with the security feature 11.

The light-diffractive or light-refractive structure 17 is expediently a surface relief in the form of a lens array; such an embodiment will in the following text always be based on the following. Expediently, a lens array 17 with individual lenses such as ball lenses, rod lenses and/or cylindrical lenses is used. The lens array 17 is arranged on the upper side of the carrier element 15 relative to the representation 16 and can be directly connected to the carrier element 15. The carrier element 15 is thus located between the lens array 17 and the representation 16.

The representation 16 has been calculated in adaptation to the lens array 17 prior to the introduction into the carrier element 15 such that, when viewing through the lens array 17, a moving representation is produced when tilting the security feature 11 or the data medium 1. For example, the moving representation can be a tilting image that tilts or changes between two or more representations when the representation 16 is moved relative to the view of the viewer. For example, the moving representation can also be a movement across multiple images. These images can be represented as moving in an endless movement.

Figure 3:
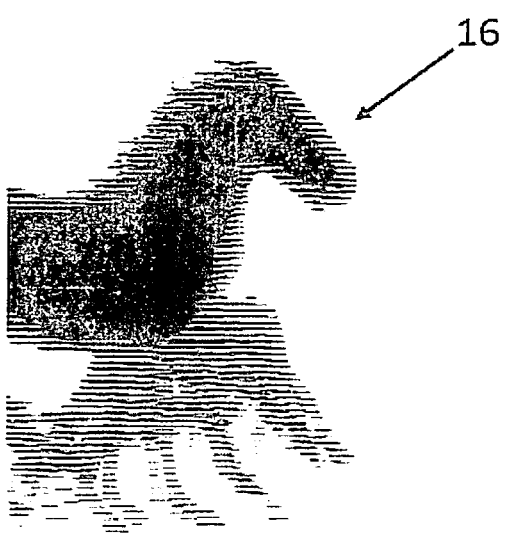
FIG. 3 shows an example of a moving representation.

An example of a moving representation 16 is shown in FIG. 3. In the example shown, when tilting the security element 11, an observer sees a movement of the forelegs of a horse. In order to achieve the impression of movement, the representation is divided into a plurality of individual elements, which are perceived through the lens array 17 in dependence on the viewing angle. The representation 16 may include, for example, a security feature based on a moiré effect, the fundamentals of which, for example, are set out in EP 2162294 B1.

Due to the fine structure of the representation 16, a multiplicity of images can be generated, since the distance between two optical structures such as a lens usually stipulates the number of images. This distance, also known as pitch, is used as a parameter in the calculation of the representation 16. One image per pitch can be provided. As part of a data preparation process before the introduction of the representation 16, the number of images is mathematically included in this representation 16.

The images contained in the representation 16 can be graphical representations, such as rotating gears, text elements, and pictorial representations. The representation may also contain personal information, such as a name, signature, date of birth or the like. In addition, the representation 16 may include data relating to the data medium 1, such as a validity period, a card number, an indication of the issuing authority or the like.

The data medium 1 may comprise additional layers, for example one or more protective layers or functional layers provided with other security elements. In this case, the transparency of the data medium 1 in the region of the security feature 11 can be maintained. This allows the security feature 11 to be viewed both from the front side and from the back side of the data medium 1.

Due to the calculated interaction between the representation 16, or its individual elements, and the lens array 17, a viewer sees the viewing-angle-dependent representation 16 when they look at the data medium 1 from the front side or the back side. If the data medium 1 with the representation 16 is swiveled or tilted, a movement of the representation 16 becomes visible, which is generated by the calculated interaction of the representation 16 with the light-diffractive or light-refractive structure 17.

Figure 4:
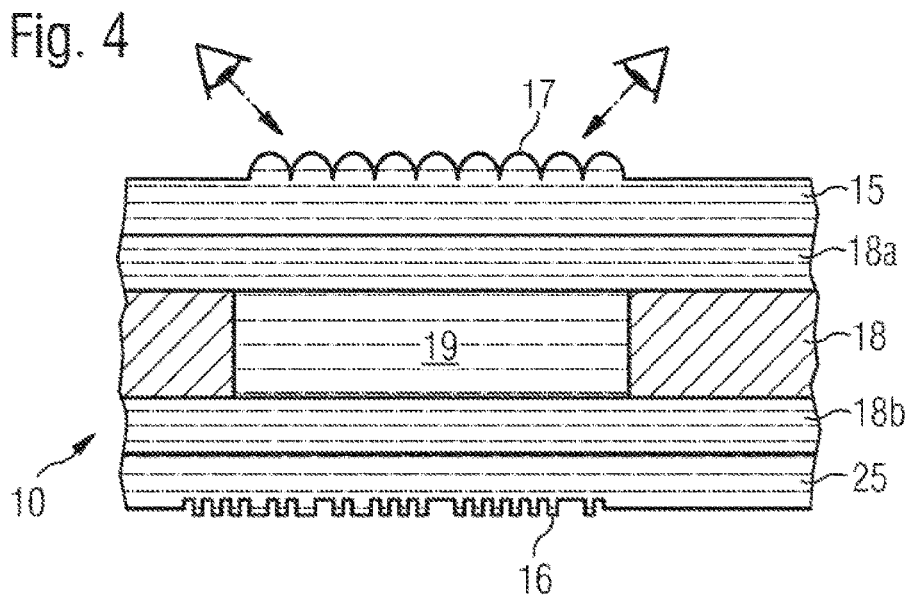
FIG. 4 shows a section through an alternate embodiment of the data medium.

FIG. 4 shows a section through an alternative embodiment of the data medium 1 along the line I-I of FIG. 1. The data medium 1 forms in the region of the security feature 11 in turn a substrate 10 which is transparent or partially transparent in the visible spectral range. The data medium 1 has a multi-layer layer structure, which is designed to be consistently transparent or partially transparent in the visible spectral range in the region in which the security feature 11 is arranged. The data medium 1 is based on a central carrier layer 18, in which a partial region 19 which is transparent or partially transparent in the visible spectral range is formed in the region of the security feature 11. The transparent partial region 19 may be a transparent insert 19, which is arranged in an opening 1*a*. The remaining part of the central carrier layer 18 may be opaque or likewise transparent.

On one side of the carrier layer 18, an upper layer 15 which is transparent or partially transparent in the visible spectral range and which forms a carrier element for the lens array 17 is arranged. On the opposite side of the carrier layer 18, a second upper layer 25 which is transparent or partially transparent in the visible spectral range is arranged. The representation 16 is molded in the form of a surface relief in the external side of said upper layer. Between the central carrier layer 18 and the upper layers 10, 25, further intermediate layers 18*a*, 18*b* which are transparent or partially transparent in the visible spectral range can be arranged.

Depending on the viewing angle, as indicated in FIG. 4, a viewer sees another aspect of the representation 16 when viewing the representation 16 through the lens array 17. For example, if the representation has the shape of a running horse, the horse appears in two different states of motion when changing between the viewing angles.

Figure 5:
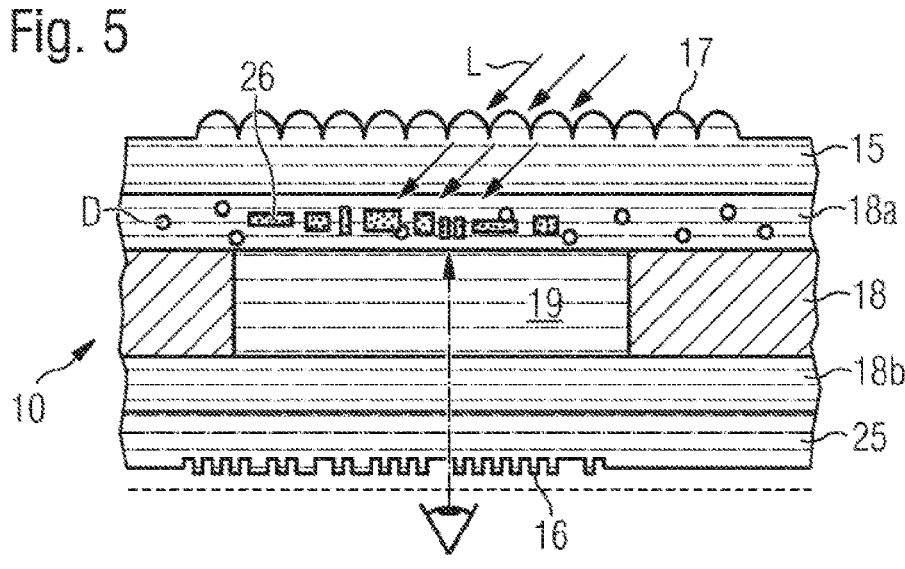
FIG. 5 shows an embodiment of the security feature with a superimposed security element.

FIG. 5 shows a preferred configuration of the security feature 11. In addition to the lens array 17 and the moving representation 16, a superimposed security element 26 is introduced into the substrate 10 with a laser. The introduction of the superimposed security element 26 takes place by the material of the substrate 10 being changed locally in terms of color by the input of laser energy. In an expedient manner, the local color change is effected by generating black or dark surface elements 27 in a layer of the substrate 10, as indicated in FIG. 5. The laser energy input L is preferably realized through the lens array 17, as indicated in FIG. 5. The substrate 10 expediently consists of at least two layers 10, 18, 18*a*, 18*b*, 25, of which at least one-indicated by small circles D—is doped such that it becomes laser-sensitive. The remaining layers of the substrate 10 are preferably laser-transmissive. In the layer 18*a* which is laser-sensitive due to doping, the local color change is configured as a superimposed security element 26 owing to the laser energy input L—for example with an NdYAG laser with 1064 nm.

The superimposed security element 26 can be a symbol, a free form, a sequence of alphanumeric characters, or an illustration. It can be data-medium-specific or standardized.

Figure 6:
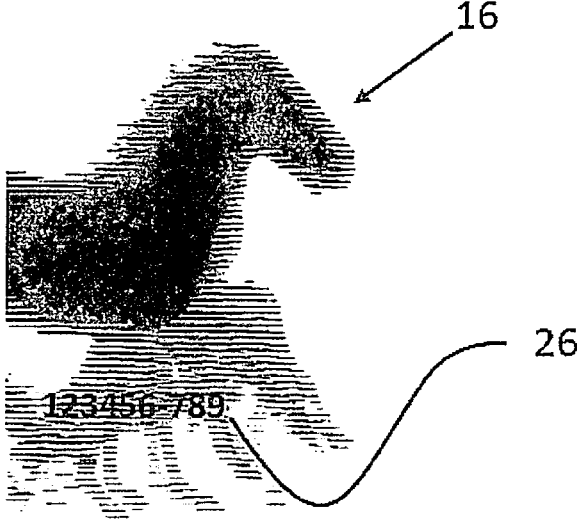
FIG. 6 shows an example of a moving representation with a superimposed security element.

FIG. 6 shows a moving representation 16 as an example of a security feature 11 with a superimposed security element 26, in which an alphanumeric piece of information 26 is introduced as a superimposed security element.

The superimposed security element 26 is also optically variable when viewed through the lens array 17. Depending on the viewing angle through the lens array 17, another version of the superimposed security element 26 appears, or the security element 26 is recognizable or not.

In addition, as indicated in FIG. 5, the superimposed security element 26 is always recognizable when viewed from the side opposite the lens array 17, i.e. from the side carrying the representation 16, regardless of the viewing angle.

In one variant, the laser energy input for forming the superimposed security element 26 can also be carried out from the side of the substrate 10 opposite the lens array 17. The superimposed security feature 26 then shows no or only a slightly pronounced optically variable effect when viewed through the lens array 17.

Figure 7:
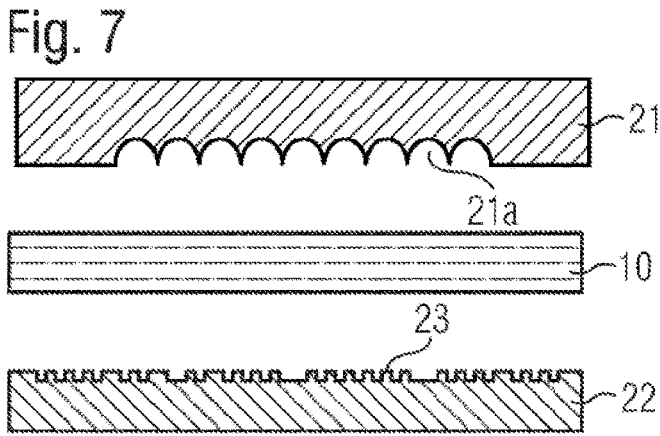
FIG. 7 shows a basic illustration of a production of a security feature.

FIG. 7 shows a basic illustration of a production of a security feature by means of a laminating device 20. The laminating device 20 is only shown in principle. In particular, means for generating pressure and/or an increased temperature are not shown.

Two lamination sheets 21 and 22 are shown, between which the substrate 10 is laminated. The substrate 10 is present in the form of a sheet of material or a film. The substrate 10 is placed between the two lamination sheets 21 and 22. The two lamination sheets 21 and 22 are then moved toward the substrate 10 to build up pressure thereon. In this case, a temperature increase is usually carried out in order to melt or at least heat the plastics material of the substrate 10 or the layer structure.

In the lamination sheet 21, a multiplicity of light-diffractive or light-refractive structures, which form, for example, a reversed lens array, are incorporated as an image presentation—depending on the molding technique being selected as a negative mold or as a positive mold or as a mixture of negative and positive molds—in the form of openings 21*a*.

During laminating, the individual light-diffractive or light-refractive structures are formed in the substrate 10 by impression of the openings 21*a* and form a lens array 17 there, for example. The light-diffractive or light-refractive structures 17 are thus fixedly connected to the substrate 10.

In the opposite lamination sheet 22, the molding structures 23 of the representation 16 are incorporated as an image presentation. The shape and relative position of the molding structures 23 were determined mathematically. The molding structures 23 correspond as a relief to a two-dimensional printed pattern. It has been shown that molding structures formed in the shape of a relief 23 achieve the same effect as a corresponding printed pattern.

The molding structures 23 of the security feature have been introduced into the lamination sheet 22, for example, by means of a laser cutting, milling, water jet cutting or a galvanic method.

Before the introduction of the molding structures 23 into the lamination sheet 22 and before the production of the light-diffractive or light-refractive structures 17, these have each been calculated as a function of one another. Thus, a moving representation of the representations 16 can be achieved with changing viewing angles.

During laminating, the lens array 17 is molded into the substrate 10 on one side of the substrate 10 and the representation 16 is simultaneously formed on the other side. In this way, the security feature 11 is created in the substrate 10. The lens array 17 and the representation 16 are thereby fused with the substrate 10 and part of the substrate 10, so that both are fixedly connected to the substrate 10.

FIG. 8 shows a laminating arrangement for added-value manufacturing of security elements 11. Two lamination sheets 21 and 22 are shown, between which the substrate 10 lies as a sheet of material or film.

A plurality of lens arrays 17 are incorporated into the lamination sheet 21, as a negative or, according to the imaging technique, optionally also as a positive or as a mixture of both. A corresponding plurality of molding structures 23 of the representation 16 are introduced as image presentations into the opposite lamination sheet 22.

In the substrate 10, a plurality of security features 11 is formed in a laminating process. The substrate 10 is moved between the two lamination sheets 21 and 22. The two lamination sheets 21 and 22 are then moved toward the substrate 10 to build up pressure on the latter there. In this case, a temperature increase is usually carried out in order to melt or at least heat the plastics material of the substrate 10.

FIG. 9 show a basic illustration of lamination sheets for the production of a security feature.

FIG. 9*a* shows a basic illustration of the lamination sheet 22 with the multiplicity of molding structures 23 of the representations 16. The molding structures 23 are arranged on the lamination sheet 22 such that a region in the size of the later security feature or the size of the later data medium remains free around each molding structure 23.

FIG. 9*b* shows the second lamination sheet 21 with the light-diffractive or light-refractive structures 17, which are arranged in each case in an opening 21*a*. The openings 21*a* and thus the light-diffractive or light-refractive structures 17 are arranged at identical positions as the molding structures 23 on the lamination sheet 22. Thus, it is ensured that the light-diffractive or light-refractive structures 17 are aligned with the representation 16 at the security feature to be produced. In this case, the spatial extents of the light-diffractive or light-refractive structures do not have to be identical to those of the representations 16.

Figure 10:
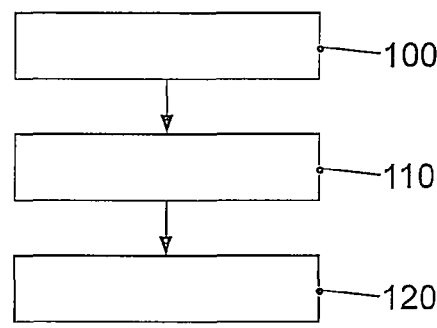
FIG. 10 shows a method for producing a security feature for a data medium.

FIG. 10 shows a method for producing a security feature 11 for a data medium 1. In a first step 10, a molding means, such as a lamination sheet 22, is provided with a molding structure 23 of a representation 16 of the security feature 11. As previously shown, a multiplicity of molding structures 23 may be provided on the molding means. The molding structure 23 can be introduced into the molding means, for example, with a laser cutting, milling, water jet cutting or a galvanic method.

In a second step 11, the representation 16 is introduced into the substrate 10 by impressing the molding structure 23. This is preferably done during the lamination of the security feature 11 or the substrate 10. In this case, the molding structure 23 is embossed or pressed into the plastics material of the substrate 10 with pressure and under the influence of heat. The resulting representation 16 comprises or consists of recesses in a surface of the substrate 10.

In a third step 120, a light-diffractive or light-refractive structure 17 is arranged on the substrate 10. The light-diffractive or light-refractive structure 17 can, for example, be fused with the substrate 10 or be connected by means of an adhesive.

The sequence of steps is not necessarily limited to this sequence. For example, the arrangement of a light-diffractive or light-refractive structure 17 can also be carried out as a first or second step. In particular, the arrangement of a light-diffractive or light-refractive structure 17 on the substrate 10 and the introduction of the representation 16 into the substrate 10 can be carried out in a common laminating process using a second lamination sheet 21.

This method can be used to produce the previously described security feature 11. The previously described lamination sheets 21 and 22 or only the lamination sheet 22 can be used here.

While retaining the basic idea, the above-described invention allows for a variety of further configurations and modifications. In particular, the described elements can be arranged in compositions other than those described. The figures and the associated descriptions should not be understood to mean that precisely only the described embodiments can be realized within the scope of the invention.

The invention claimed is:

1. A method for producing a security feature for a data medium, comprising the steps of:
providing a substrate of plastic material which is transparent or partially transparent in the visible spectral range;
providing a molding means which has a molding structure and forms an image presentation of a representation which together with a light-diffractive or light-refractive structure generates an optically variable image;
introducing the representation into one side of the substrate by impressing the molding structure;
forming a light-diffractive or light-refractive structure on the opposite side of the substrate; and introducing a superimposed security element into the substrate with a laser by changing the substrate material locally in terms of color;
wherein the introduction of the superimposed security element takes place through the light-diffractive or light-refractive structure;
wherein the superimposed security element is optically variable when viewed through the light-diffractive or light-refracting structure.

2. The method as claimed in claim 1, wherein the molding means is a lamination sheet and the representation is introduced during lamination of the substrate.

3. The method as claimed in claim 2, wherein the light-diffractive or light-refractive structure is disposed on the substrate during lamination by means of a second lamination sheet and the steps of introducing the representation into one side of the substrate by impressing the molding structure and forming a light-diffractive or light-refractive structure on the opposite side of the substrate are carried out in a common laminating process.

4. The method as claimed in claim 1, wherein the substrate has at least one laser-sensitive layer and the superimposed security element is formed in this layer.

5. The method as claimed in claim 1, wherein the introduction of the superimposed security element takes place after the production of the first security feature.

6. The method as claimed in claim 1, wherein the molding structure is introduced into the molding means with a laser cutting, milling, water jet cutting or a galvanic method.

7. The method as claimed in claim 1, wherein elements of the molding structure are calculated such that the representation is a moving representation when the security feature is tilted.

8. The method as claimed in claim 1, wherein the molding means is a stamp and in that the representation is introduced after lamination of the substrate.

9. A data medium, including a value document or a chip card, comprising a carrier on or in which a security feature as claimed in claim 1 is arranged.

10. A data medium, including a value document or a chip card, comprising a carrier on or in which a security feature as claimed in claim 1 is arranged, further comprising the superimposed security element.

11. A lamination sheet for the production of a security feature as claimed in claim 1 for a data medium, having a molding structure which is an image presentation of a representation which together with a light-diffractive or light-refractive structure generates an optically variable image.

12. The lamination sheet as claimed in claim 11, wherein the molding structure is introduced into the molding means with a laser cutting, milling, water jet cutting or a galvanic method.

13. The method as claimed in claim 1, wherein the local color change is effected by generating black or dark surface elements in the substrate.

14. A security feature for a data medium, the security feature comprising:
a substrate which is transparent or partially transparent in the visible spectral range and in which a representation has been molded on one side of the substrate and a light-diffractive or light-refractive structure is formed on an opposing side of the substrate,
wherein the representation together with the light-diffractive or light-refractive structure generates an optically variable image, wherein the light-diffractive or light-refractive structure at least partially covers the representation and interacts with the representation in order to generate a moving representation when the security feature is tilted, and wherein the security feature further include a superimposed security element having locally changed substrate material, wherein the superimposed security element is optically variable when viewed through the light-diffractive or light-refracting structure.

15. The security feature of claim 14, wherein the representation is viewable from both sides of the substrate.

\* \* \* \* \*